United States Patent
Quesnelle et al.

(10) Patent No.: US 11,461,187 B2
(45) Date of Patent: Oct. 4, 2022

(54) PROTECTING LARGE DISTRIBUTED FILE SYSTEMS

(71) Applicant: EMC IP Holding Company LLC, Hopkinton, MA (US)

(72) Inventors: Scott Quesnelle, Burlington (CA); Gururaj Kulkarni, Bangalore (IN); Ati Pavan Kumar, Bangalore (IN); Rangapuram Ravi Kishore Yadav, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/121,590

(22) Filed: Dec. 14, 2020

(65) Prior Publication Data

US 2022/0188199 A1 Jun. 16, 2022

(51) Int. Cl.
G06F 11/14 (2006.01)
G06F 16/13 (2019.01)
G06F 16/182 (2019.01)

(52) U.S. Cl.
CPC ........ *G06F 11/1464* (2013.01); *G06F 16/134* (2019.01); *G06F 16/183* (2019.01); *G06F 2201/805* (2013.01)

(58) Field of Classification Search
None
See application file for complete search history.

(56) References Cited

U.S. PATENT DOCUMENTS

| | | | |
|---|---|---|---|
| 9,628,561 B1* | 4/2017 | Kulkarni | G06F 9/45558 |
| 9,977,718 B1* | 5/2018 | Kulkarni | G06F 11/1461 |
| 10,997,036 B1* | 5/2021 | Chopra | G06F 3/0607 |
| 2009/0157850 A1* | 6/2009 | Gagliardi | G06F 16/951 |
| | | | 709/219 |
| 2010/0306368 A1* | 12/2010 | Gagliardi | G06F 16/951 |
| | | | 709/224 |
| 2012/0260227 A1* | 10/2012 | Shukla | G06F 8/35 |
| | | | 717/104 |
| 2021/0182253 A1* | 6/2021 | Quesnelle | G06F 11/2094 |
| 2021/0240576 A1* | 8/2021 | Appireddygari Venkataramana | G06F 11/1461 |
| 2021/0271504 A1* | 9/2021 | Yu | G06F 11/1469 |

* cited by examiner

*Primary Examiner* — Kim T Nguyen
(74) *Attorney, Agent, or Firm* — Staniford Tomita LLP (57) ABSTRACT

Responsibility for protecting a distributed file system is split across different client hosts. Each client host is assigned a subset of the distributed file system to backup. An index host is identified to create a common namespace under which different client file indexes generated by the different client hosts during backups of respective subsets of the file system will be maintained. During backups, different client file indexes are received from the different client hosts. The client file indexes include metadata about files in the file system included in the backups. Each of the different client file indexes are associated to the same common namespace to provide a unified view of all files across all subsets of the file system that have been backed up by the different client hosts.

18 Claims, 5 Drawing Sheets

PROTECTING LARGE DISTRIBUTED FILE SYSTEMS

TECHNICAL FIELD

The present invention relates generally to the field of information management, and, more particularly, to backing up distributed file systems.

BACKGROUND

Conducting backups of a file system helps to protect against data loss events. Part of the backup process involves indexing. Indexing creates a catalog of files that have been included in the backups. Should there be a need to perform a recovery, the catalog can be accessed to determine what files are available to be recovered.

A distributed file system is a type of file system in which data may be spread across multiple storage devices. The distributed file system can present a global namespace to clients in a cluster accessing the data so that files appear to be in the same central location. Distributed file systems are typically very large and may contain many hundreds of thousands or even many millions of files. In order backup such a large file system in a reasonable amount of time, multiple backups may be run in parallel. Such backups, however, have the side effect of breaking the global namespace resulting in indexing under separate namespaces. This makes searching and browsing files for recovery a slow and frustrating process.

There is a need for improved systems and techniques for protecting a distributed file system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. The variable N and other similar index variables are assumed to be arbitrary positive integers greater than or equal to two.

Figure 1:
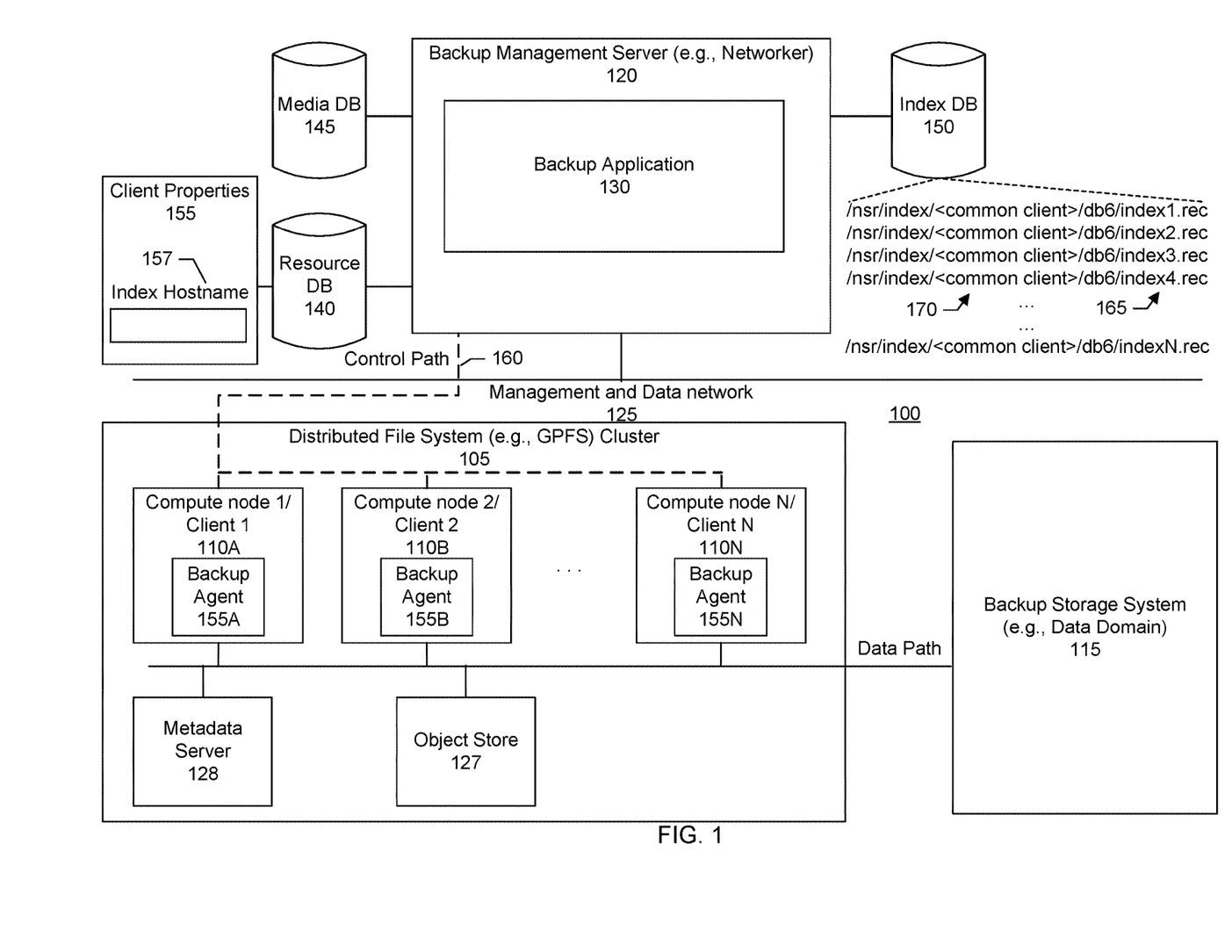
FIG. 1 shows a block diagram of an information handling system for protecting a large distributed file system in accordance with one or more embodiments.

FIG. 1 shows a block diagram of a system 100 for protecting a large distributed file system 105. Responsibility for protecting the file system is split across multiple compute nodes or client hosts 110A-N. These nodes participate in the backup workflow. A client host may be referred to as a proxy host or backup proxy as a client host can assist a backup management server with a backup of the file system.

Each client host is assigned responsibility for protecting a particular subset of a high-level directory structure of the distributed file system. High aggregated backup throughput can be achieved by having individual clients protect their own data by backing up or copying their data directly to the backup target storage devices. Part of the backup process includes the client hosts generating metadata so that the objects and items (e.g., files) included in the backup can be tracked. While spreading the backup responsibility across multiple client hosts can increase backup throughput, it can complicate recovery because each client host may be generating and transmitting their own individual backup metadata independent of another client host during a backup of the file system. This makes it difficult during recovery to obtain a single unified view of all the files in the file system that have been backed up.

In an embodiment, backup metadata generated when performing backups across the multiple client hosts is consolidated into a common namespace under a single global index client. The backup metadata includes client file indexes. A client file index includes file history information such as a listing of files included in a particular backup, time of the particular backup, file path, access permissions, data size, ownership information, and other attributes. The global index client may be referred to as an index host. The index host or name of the index host can be used to browse and view the entire backed up distributed file system from a single place—without having to map between directories and the respective client hosts assigned to backup the various directories of the distributed file system. In other words, an administrator can view the backup of an entire distributed file system from a single place without having to manually map directories to each of the individual client hosts. This helps to facilitate recovery as the administrator can use the index host to view all the different subsets of files (and folders) of the distributed file system despite the different subsets having been backed up by different client or proxy hosts. Files can be restored to the same client that was originally responsible for backing up the files or to a different client.

Today, modern data centers are evolving to efficiently manage the data explosion by offloading the compute, input/output (TO) and network processing to an underlying clustered subsystem. This evolution of data and its growth creates a challenge for the modern data protection software. The modern data protection software needs to evolve to efficiently handle the data protection challenges. In an embodiment, systems and techniques are provided to protect large distributed file systems such as IBM Spectrum Scale, also referred to as general parallel file system (GPFS), or Lustre FS. Aspects and principles of the systems and techniques described herein may further be leveraged for large network attached storage (NAS) arrays.

There are several large distributed file systems providing a highly scalable architecture. These file systems can scale a single distributed file system cluster up to 100 terabytes (TB). The distributed file system architecture such as IBM Spectrum Scale or open source Lustre FS can scale up to multiple TBs using scale-out cluster architecture. This scale is not unique to distributed file systems. NAS vendors are also providing highly scalable solutions with a single NAS share scaling to 1 petabyte (PB). Isilon®, as provided by Dell EMC of Hopkinton, Mass. is one such example where a share can scale beyond 1 PB.

Protecting distributed file systems utilizing traditional single node methods is not viable. A single host does not have enough bandwidth to read all the data in a reasonable amount of time. To effectively protect these file systems, parallelization of the backup is desirable. To achieve that parallelization, multiple hosts are employed. This splitting of the file system achieves the necessary performance, but at the expense of the ease of recovery. The splitting of the data fragments the metadata about the backup. This makes recovery, backup synthesis and ensuring that complete protection has been achieved difficult.

Network attached storage (NAS) filers at scale face a similar issue. A NAS filer is an all-in-one appliance that attaches to a network to provide storage capacity. A typical NAS filer can provide several hundred gigabytes to a couple of terabytes of storage in a single package, along with network connectivity and the associated software, such as an operating system (OS). NAS filers rely on the open standard network data management protocol (NDMP) to transport data between network attached storage (NAS) devices and backup devices. This removes the need for transporting the data through the backup server itself, thus enhancing speed and removing load from the backup server.

Single stream NDMP does not have sufficient bandwidth to provide protection. There have been proprietary extensions to NDMP that allow for multi streaming, but they have limited scalability. An alternative is to use multiple proxy hosts, and have them access the NAS share, but this will suffer from the same issues around recoverability, backup synthesis and protection coverage.

The system shown in FIG. 1 includes distributed file system cluster 105, a backup storage system 115, a backup management server 120, and a management and data network 125 interconnecting the components. Examples of a backup storage system and backup management server include Data Domain and Networker, respectively, as provided by Dell EMC.

Data Domain is a deduplicated storage system. In a deduplication-based system, data such as files to be backed up are divided into a set of segments. The segments are hashed to generate a set of fingerprints. These fingerprints uniquely identify the segments. The backup system maintains metadata separate from the actual client data being backed up. The metadata includes a collection of fingerprints corresponding to data segments that already exist on the backup system. If the fingerprint of a data segment from a file to be backed up does not match an existing fingerprint, the data segment is written to the physical disk storage of the backup system and the fingerprint is added to the collection of existing fingerprints. If, however, the fingerprint matches an existing fingerprint, the data segment is determined to be a duplicate and is not written to the backup storage system. Instead, a reference is generated that points to the already existing data segment on backup storage that corresponds to the fingerprint. The reference is stored as metadata by the backup system so that the file can be reconstructed or reassembled as part of a restore operation.

While some embodiments are described in conjunction with a data protection system referred to as Data Domain or Networker, it should be appreciated that aspects and principles of the systems and techniques described herein can be applied to other backup or data protection systems provided by other vendors. It should be appreciated that the blocks, components, and modules shown in FIG. 1 and elsewhere may be functional and there can be many different hardware configurations, software configurations, or both to implement the functions described.

The system shown in FIG. 1 is designed to protect a highly scaled distributed file system and/or NAS shares. In an embodiment, a single unified name space is provided for indexing all backups related to this distributed file system or NAS. Synthetic copies of the data for traditional full and incremental backup may be created using a single namespace (one common proxy). This data can be viewed as an entire file system of a NAS share or distributed file system. The system is able to fully utilize bandwidth of multiple proxy nodes to improve throughput. Backup administrators do not have to manually configure individual clients that are part of the large distributed file system and protect each of these clients with their own file history information which is part of the large distributed file system.

In an embodiment, multiple proxy hosts or nodes of the cluster provide protection of the distributed file system. These nodes are instructed and have the ability to store their metadata under a common namespace. The hosts to be protected may be referred to as clients. These clients gather the data to be protected and store it on a storage device remote to the host. The metadata for the backup is stored on a central server. This metadata describes the set of objects in this backup. Each client stores their backup metadata in a common namespace. This is done both for security and for performance benefits. The metadata is used to recover selected files as well as to show the history of a file or object over a set of backups. In an embodiment, each client stores their "client file index" under a "common namespace" designated as "index hostname" in each client properties' configuration information.

For a distributed file system, multiple proxy hosts are provided to process the large quantity of data and meet the requirements of a customer. By using multiple hosts, the work can be split among them, thus increasing available bandwidth and compute resources. This in turn helps decrease the time required to protect all the data. The problem this creates is that the metadata is also split. This creates a difficulty at time of recovery since the user must be aware of how the data was split at the time of backup to be able to know under which proxy host's metadata, they should look for the files or objects they wish to recover. Splitting also creates issues on the data protection server when it attempts to create a new full backup based upon the current backup data. The process of creating a new full backup requires access to all the metadata, without that it is unable to synthesize a new full backup. To resolve this, systems and techniques provide a common namespace. This common namespace allows for all the proxy hosts to store their metadata entries together, resolving both the issues of recovery and new full backup synthesis.

A file system is responsible for organizing data stored on media and presenting that data in a logical format. A distributed file system is a type of file system in which file data is spread across multiple storage devices. This helps to scale file access bandwidth and facilitate file sharing. The distributed file system can unify local file systems into a single large file system with a unified namespace. Thus, the distributed file system can present the clients with a unified namespace through which files and data of the file system may be accessed.

In the distributed file system, the management of file metadata may be separated from the actual file data. Metadata is information about other data. Metadata can include information describing the location of data objects making up a file, file object layout information, file names, directory structure, file ownership, creation date, access permissions, and so forth. In an embodiment, the distributed file system includes an object store 127 and a metadata server 128.

The object store is responsible for storing active file data objects. The object store may include multiple storage devices on which file data is stored. The metadata server 128 is responsible for handling metadata storage and operations and namespace. The client compute nodes access the object store through the metadata server. For example, when a client compute node wishes to perform an I/O, the metadata server provides the client compute node with metadata information describing the location of the objects making up the file.

The backup management server is responsible for managing the backup and recovery of the distributed file system. The backup management server maintains a catalog including the files and folders of the distributed file system that have been backed up. The backup management server includes a backup application 130 connected to a resource database 140, media database 145, and index database 150.

The backup application directs the overall operation of backups and recoveries of the distributed file system. The backup application manages metadata and data streams associated with the backups. The data stream may be directed to backup storage system 115. The metadata stream may be directed to a central server (e.g., backup management server) separate from the data stream. The backup application may include code components or code modules such as a backup/recovery engine that transfers data between the file system cluster and backup system, a deduplication engine that reduces the amount of redundant data stored, and a console that provides a user interface through which an administrator can configure backup settings, schedule backups, configure host clients and proxies for backups, configure save sets (e.g., select files and folders to be included in a backup), view and browse different backups (e.g., save sets) of the file system, initiate recoveries, and perform other administrative operations and configuration tasks.

One or more of the resource, media, or index databases may reside on the backup management server itself. In another embodiment, one or more of the resource, media, or index databases may reside on the backup storage system. The resource database may be referred to as a resource administration platform (RAP) database. The resource database stores configuration information for each configured resource. Resources include the client nodes and backup storage devices. The index database provides a catalog for browsing the various save sets or backups that have been conducted of the file system. The index database stores backup metadata including indexes of the data items (e.g., files and folders) backed up by the client nodes. The media database tracks the location of the backup volumes on which the backed up data items may be stored.

The client compute nodes include backup agents 155A-N installed at the nodes. A control path 160 connects the backup management server to the nodes. The backup application at the management server communicates with the nodes via the control path and coordinates with the backup agents at the nodes to perform backups and recoveries of the distributed file system.

For example, backups may be scheduled to be performed at regular intervals. When a time for backup arrives, the backup management server issues an instruction to the client nodes to begin backup jobs of respective subsets of the distributed file system that has been split across the client nodes. A client node may process a backup job for an assigned subset of the distributed file system in parallel or concurrently with another client node processing another backup job of its assigned subset of the distributed file system. Each backup job includes transmitting file data by the client nodes to the backup storage system and transmitting backup metadata by the client nodes to the backup management server. The backup storage system includes processes to write the file data to an appropriate storage volume of the storage system. A backup may be defined by a save set. A save set can specify a grouping of files and directories or even entire file system that is to be backed up as a unit to the storage system. A save set can specify any number of files and directories to be included in a backup. A save set may include hundreds of thousands or even millions of objects, e.g., files.

Metadata is generated during a backup of the distributed file system by the different client proxy host nodes. In an embodiment, the metadata includes different client file indexes generated by the different client nodes. A client file index of a client node includes a listing of the files that have been backed up by the client node. The client file index stores information about each file backed up by the client node. The information may be referred to as a file history. Each file on each client that is backed up is listed in the file index. There can be one client file index per physical client node. The stored information includes file characteristics such as owner, size, permissions, path, file type, and modification and access times, as well as the timestamp of when the file was backed up. All files in a given save set may have the same or identical backup timestamp. This information is used to support browsable recoveries, which allow for recovering a client, or more specifically the file system or a portion of the file system, to a specific point in time. In other words, the client file indexes store information about a save set. The client file indexes can be examined to determine what files or versions of files are available to be recovered. In this embodiment, the client file indexes generated and transmitted by the different proxy hosts or client nodes are associated with a common namespace. That is, the client file indexes are consolidated under a single common client.

The backup application storing the metadata on a central server separate from the data stream allows for the redirection of the metadata stream into a common namespace. This metadata stream is stored under a master client name. This allows all the backups to be indexed under a single name. More particularly, in an embodiment, backups are conducted across multiple physical clients, each protecting a subset of the high-level directory structure. Client file indexes that are generated from all the physical clients are consolidated under a single common client. During recovery, the administrator can view the entire file system from a single place rather than manually mapping which subset of directories were backed up by which physical client. The administrator need not be concerned with which client mounted what part of the file system because the common client allows searching across the entire file system.

The common namespace provides security measures to control access. In an embodiment, the common namespace is specified in an attribute provided in the resource specifying the client in the resource database. This allows for providing the proxy hosts with an identification of the common namespace.

In an embodiment, the layout of the backups index entries is such that overlapping entries are allowed. These entries facilitate handling of non-perfect splits, and for items such as soft and hard links. Hard link content may be protected multiple times, if they are split across the file system. Consider, as an example, a "static split" of a distributed file system across multiple clients, which is manually performed by the end user administrator. This could potentially lead to "overlapping" of entries in different clients. For example, if the distributed file is "/gpfs1" and assuming it has two directories such as "/gpfs1/c1/d1, /gpfs1/c2/d1", then the administrator user could potentially configure the same directory under two different clients. A first client may be assigned "/gpfs/c1/d1" to protect. A second client may also be assigned the same path "/gpfs/c1/d1" as well as the path "/gpfs/c2/d1." Allowing overlapping index entries allows backups to be performed successfully and without any failures due to assignments of the same paths to different clients.

Figure 2:
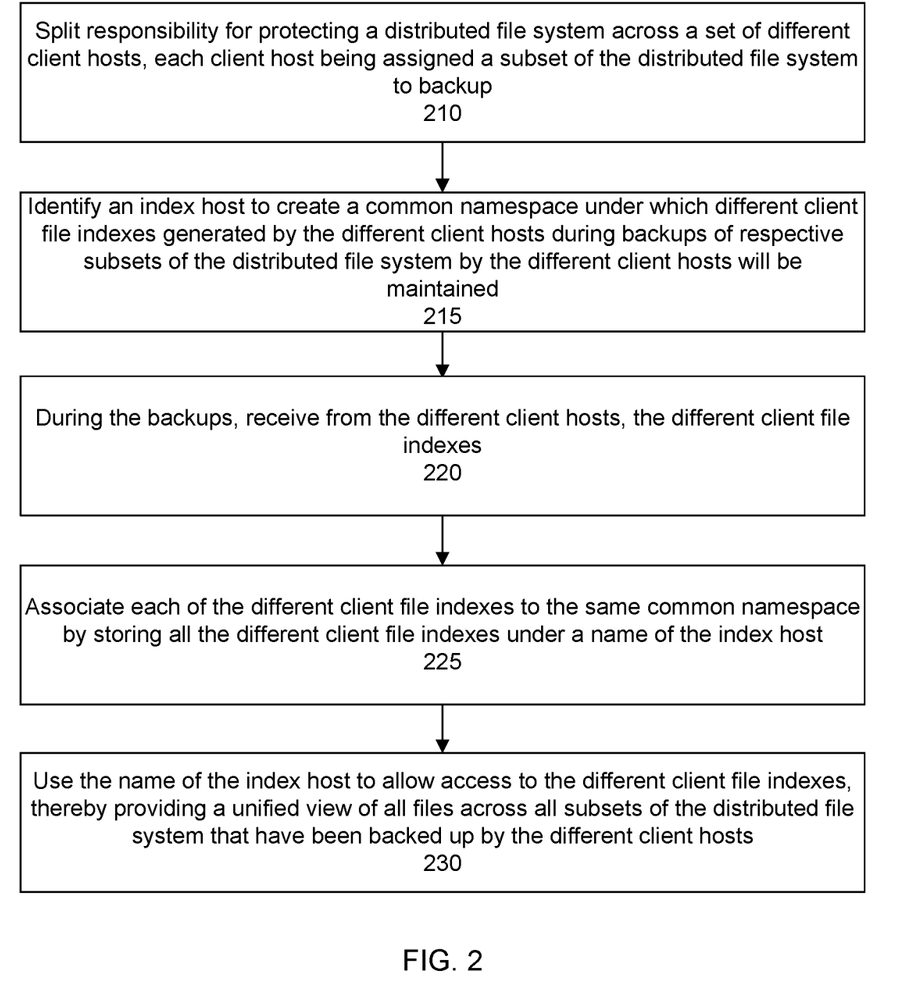
FIG. 2 shows an overall flow for protecting the distributed file system in accordance with one or more embodiments.

FIG. 2 shows an overall flow for protecting a distributed file system under a common namespace. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 210, responsibility for protecting a distributed file system is split across a set of different client hosts, each client host being assigned a subset of the distributed file system to backup. In a distributed file system, no single client "owns" the file system. Consider, as an example, that the distributed file system includes a set of directories. A first client host may be assigned responsibility for protecting a first subset of the directories. A second client host may be assigned responsibility for protecting a second subset of the directories. A third client host may be assigned responsibility for protecting a third subset of the directories and so forth. The first client host may be different from the second and third client hosts. The second client host may be different from the third client host. For example, each client host may be assigned a particular internet protocol (IP) address, a particular name, and so forth. The first subset of directories may be different from the second and third subset of directories. The second subset of directories may be different from the third subset of directories.

In a step 215, an index host is identified to create a common namespace under which different client file indexes generated by the different client hosts during backups of respective subsets of the distributed file system by the different client hosts will be maintained.

In an embodiment, the index host is identified by prompting an administrator to specify a name of a client host that is to be the index host. The client host can be any node configured in the resource database and may or may not be participating in the distributed file system. For example, referring back now to FIG. 1, during initial configuration of the backup system, a client properties dialog window 155 is displayed to the administrator through a graphical user interface. The client properties dialog window includes an input box 157 where the administrator can enter the name of a client that is to be the index host. The administrator can configure a single namespace for global indexing of the client file indexes by specifying a client host to be an index host. Upon specifying the name of the index host, the clients are instructed to index their backup metadata using the name of the index host.

In a step 220 (FIG. 2), the backup management server can initiate a backup of the distributed file system by instructing each of the different client hosts to begin backups of the subsets of the distributed file system that have been assigned to the client hosts. During the backups of the respective subsets of the distributed file system, different client file indexes are received by the backup management server from the different client hosts.

In a step 225, each of the different client file indexes are associated to the same common namespace by storing all the different client file indexes under a name of the index host. In other words, rather than indexing under individual or separate directories corresponding to the different client hosts (i.e., under individual namespaces) indexing is instead performed under a single common namespace in order to provide a complete view of the entire distributed file system.

For example, referring back now to FIG. 1, a new namespace has been introduced at each client participating in the backup. Each client utilizes this namespace when they are creating a backup. On the data protection management server, the backup application creates all the backup records, index records under this new namespace. As shown in the example of FIG. 1, client file indexes 1-N 165 (i.e., "index1.rec," "index2.rec," "index3.rec," "index4.rec," . . . "indexN.rec") have been received from corresponding clients 110A-N.

However, instead of the client file indexes being organized or stored in directories according to each client (e.g., "client1," "client2," "client3,", "client4," . . . "clientN"), all the index records are created under a common client 170 (e.g., "/nsr/index/<common client>/db6"). The example shown in FIG. 1 illustrates the client file indexes being stored in a subdirectory labeled "db6" under the common client. In other words, rather than each client file index being stored under a namespace corresponding to each of the different clients, the file indexes are instead stored under a namespace of the common client. The client file indexes are disassociated from the individual clients and associated with the common client.

For example, a first client file index received from a first client proxy host may be stored under a name of an index host. A second client file index received from a second client proxy host, different from the first client proxy host, may likewise be stored under the name of the index host. The name of the index host may be different from a name of the first client proxy host, a name of the second client proxy host, or both. The first and second client file indexes may be stored in a directory corresponding to the name of the index host.

In a step 230 (FIG. 2), the name of the index host is used to allow access to the different client file indexes, thereby providing a unified view of all files (and folders) across all subsets of the distributed file system that have been backed up by the different client proxy hosts. In other words, as part of recovery operation, the administrator can give or provide this new namespace and the administrator can view all the files/folders of the distributed file system that have been backed up thus retaining the unified view of the file system. For example, to initiate a recover, the administrator can specify the name of the index host to browse all files that were included in a backup or save set, regardless of the files having been backed up by different client proxy hosts. The administrator does not have to specify the names of each particular client proxy host that was responsible for backing up each corresponding subset of the distributed file system.

In other words, all proxy hosts send their metadata under a common client (common namespace) thus maintaining single namespace for all the files/folders of the distributed file system. Consequently, cloning and synthetic full operations are performed using this common client.

Figure 3:
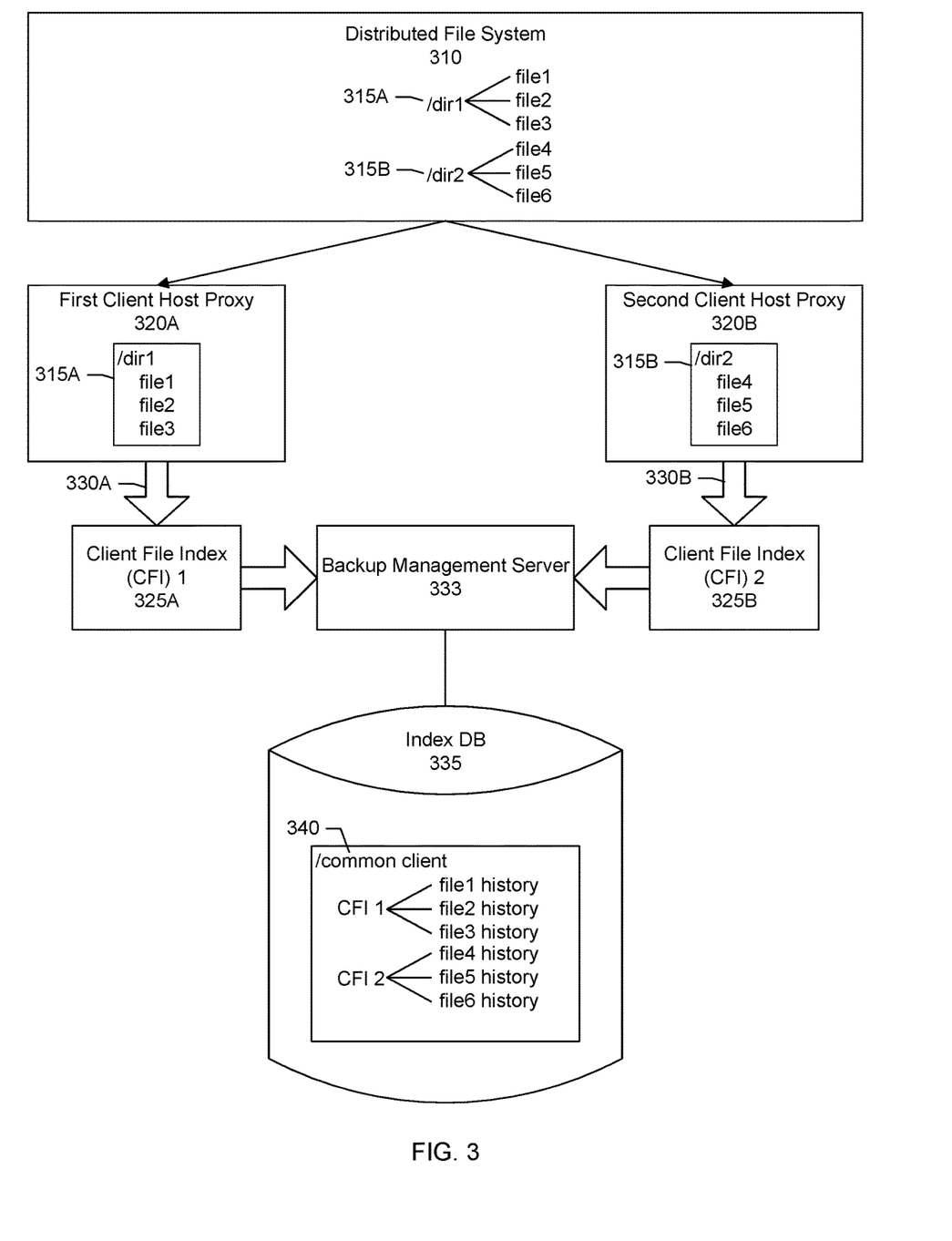
FIG. 3 shows a block diagram example for associating different client file indexes generated by different client hosts during backups to a common namespace in accordance with one or more embodiments.

FIG. 3 shows a block diagram example of the process shown in FIG. 2. In this example, a distributed file system 310 includes a first directory 315A and a second directory 315B. The first directory includes first, second, and third files. The second directory includes fourth, fifth, and sixth files. Protection of the distributed file system is split across first and second client host proxies 320A,B. Specifically, the first client host proxy is assigned responsibility for protecting the first directory including the first, second, and third files. The second client host proxy is assigned responsibility for protecting the second directory including the fourth, fifth, and sixth files.

During a backup of the distributed file system, metadata about the files being backed up is generated. Specifically, the first client host proxy generates a first client file index (CFI) 325A. The first client file index includes file history information for the first, second, and third files. The second client host proxy generates a second client file index 325B. The second client file index includes file history information for the fourth, fifth, and sixth files.

As part of the backup, the client host proxies transmit their index files to the backup management server. Specifically, the first client host proxy transmits 330A the first client file index to a backup management server 333. The second client host proxy transmits 330B the second client file index to the backup management server. In an embodiment, each transmission of the client file index to the backup management server may be accompanied by a specification or identification of the common client (e.g., index host). Thus, from the perspective of the backup management server, there are first and second instances of the same client (i.e., common client) transmitting different client file indexes. A client file index from a client host proxy may be transmitted to the backup management server upon the client host proxy completing its copying of file data to the backup storage system. Thus, different client file indexes from the different client host proxies may be received by the backup management server at different times as each client host proxy completes their copying of file data to the backup storage system. A backup or backup cycle of the distributed file system may be marked as complete when all client file indexes have been received by the backup storage system.

The backup management server receives the first client file index from the first client host proxy, the second client file index from the second client host proxy, and stores the first and second client file indexes in an index database 335. Specifically, the first client file index is stored in a directory 340 corresponding to the name of the common client. Similarly, the second client file index is stored in the same directory corresponding to the name of the common client.

Thus, even though each client host proxy is sending their file history information individually to the backup management server, the file history information is not logged under each individual name of the client host proxies. Instead, the file history information is logged under the same common client. This common client directory thus contains the index files that allows the backup management server to provide an on-line database of the files backed up to the backup storage system. An administrator can browse the on-line database by specifying the name of the common client rather than having to specify the name of the first and second client host proxies.

In other words, rather than each host creating backup metadata (e.g., client file indexes and backup records) with respect to its own hostname, each host creates the backup metadata with respect to the index hostname. Consider, as an example, that directories dir1, dir2 and dir3 are configured in client1, client2 and client3 respectively for the backup; and the backup management server creates metadata information for dir1 under the host "client1". If the administrator wishes to browse the "dir2" as part of recovery operation, the administrator must specify "client2". That is, without the common client, the administrator must be aware of the directory to host mapping to correctly perform recover operation.

The common client further facilitates cloning and synthetic backup operations. A clone operation can be used to duplicate a save set. Without the common client, cloning operations require individual client level filtering to specify a particular "individual client name." Consider, for example, a distributed file system being backed up by first and second clients. Cloning for client level filtering would need to be run for each individual client. However, with the common client, the clone with client level filtering can be performed using the "index hostname" which has a "common index namespace" having the entire distributed file system indexes.

A synthetic backup operation can be used to create a "full" backup by combining other already existing backups. Typically, an initial backup level of the file system will be a full backup. Subsequent backups will be incremental backups. Incremental backups, in which only changed data is backed up, can generally be completed in much less time and with less bandwidth as compared to conducting full backups. However, the recovery times with incremental backups can be lengthy because of the need to process what may be multiple incremental backups. A synthetic full backup, however, can be used to consolidate a previous full backup with subsequent incremental backups into a new "full" backup. Recovering using a synthetic full backup can be accomplished much faster as compared to having to apply changes across multiple incremental backups.

A synthetic full operation requires consolidation of all of the client file indexes (e.g., indexes associated with full plus incremental backups) to build new full backup. Without the common client, the synthetic full operation is required to process each client's client file indexes (e.g., full plus incremental backups). However, with the common client, a synthetic full operation can be performed on the "index hostname with the common index namespace." Thus, processing can be limited to a single client having all the indexes. Having a single namespace facilitates synthetic full operations by allowing an identification of all the files necessary to be synthesized into a new "full" backup.

In an embodiment, the common namespace forms the foundation for automatic compute node discovery, and the ability to dynamically split the distributed file system. A discussion of techniques that may be leveraged for dynamic splitting is described in U.S. Pat. No. 9,323,759, issued Apr. 26, 2016, which is incorporated by reference along with all other references cited. The common namespace can facilitate a protection mechanism for NAS based hosts using proxy nodes. Those nodes can utilize the same mechanism of common namespace for centrally indexing the NAS filer. The common namespace can further facilitate automated discovery of the distributed file system and proxy nodes; parallel and intelligent walk and split of a single large distributed file system across all configured clients for backup; dynamically splitting and balancing the distributed file system onto multiple proxy hosts by equal size of density-based distribution; automatic protocol selecting the best protocol for protection based upon proxy attributes; utilizing distributed file system snapshots as the basis for the backup (e.g., create a snapshot, mount it across the proxy nodes, perform data protection and then delete snapshot upon completion); and leverage of the distributed file system's unique capabilities for discovering file changes based upon the file history information.

In an embodiment, there is a method for protecting a distributed file system including: splitting responsibility for protecting the distributed file system across a plurality of different client hosts, each client host being assigned a subset of the distributed file system to backup; identifying an index host to create a common namespace under which different client file indexes generated by the different client hosts during backups of respective subsets of the distributed file system by the different client hosts will be maintained; during the backups, receiving, from the different client hosts, the different client file indexes, the different client file indexes comprising metadata about files in the distributed file system included in the backups; associating each of the different client file indexes to the same common namespace; and allowing the different client file indexes to be accessed using a name of the index host, thereby providing a unified view of all files across all subsets of the distributed file system that have been backed up by the different client hosts.

The identifying an index host may further include: prompting an administrator to specify a name of the index host. Associating each of the different client file indexes to the same common namespace may include: storing all the different client file indexes under a name of the index host, the name of the index host being different from a name of a client host that generated a client file index.

In an embodiment, a method includes: receiving, during a backup of a first subset of the distributed file system, a first client file index from a first client host; receiving, during a backup of a second subset of the distributed file system, a second client file index from a second client host; and storing the first client file index and the second client file index in a directory corresponding to the name of the index host, wherein the name of the index host is different from a name of the first client host, a name of the second client host, or both the name of the first client host and the name of the second client host.

The method may include: maintaining each of the different client file indexes under the name of the index host. The method may include: instructing each of the different client hosts to index backups of the distributed file system under the index host.

In another embodiment, there is a system for protecting a distributed file system, the system comprising: a processor; and memory configured to store one or more sequences of instructions which, when executed by the processor, cause the processor to carry out the steps of: splitting responsibility for protecting the distributed file system across a plurality of different client hosts, each client host being assigned a subset of the distributed file system to backup; identifying an index host to create a common namespace under which different client file indexes generated by the different client hosts during backups of respective subsets of the distributed file system by the different client hosts will be maintained; during the backups, receiving, from the different client hosts, the different client file indexes, the different client file indexes comprising metadata about files in the distributed file system included in the backups; associating each of the different client file indexes to the same common namespace; and allowing the different client file indexes to be accessed using a name of the index host, thereby providing a unified view of all files across all subsets of the distributed file system that have been backed up by the different client hosts.

In another embodiment, there is a computer program product, comprising a non-transitory computer-readable medium having a computer-readable program code embodied therein, the computer-readable program code adapted to be executed by one or more processors to implement a method for protecting a distributed file system, the method comprising: splitting responsibility for protecting the distributed file system across a plurality of different client hosts, each client host being assigned a subset of the distributed file system to backup; identifying an index host to create a common namespace under which different client file indexes generated by the different client hosts during backups of respective subsets of the distributed file system by the different client hosts will be maintained; during the backups, receiving, from the different client hosts, the different client file indexes, the different client file indexes comprising metadata about files in the distributed file system included in the backups; associating each of the different client file indexes to the same common namespace; and allowing the different client file indexes to be accessed using a name of the index host, thereby providing a unified view of all files across all subsets of the distributed file system that have been backed up by the different client hosts.

Figure 4:
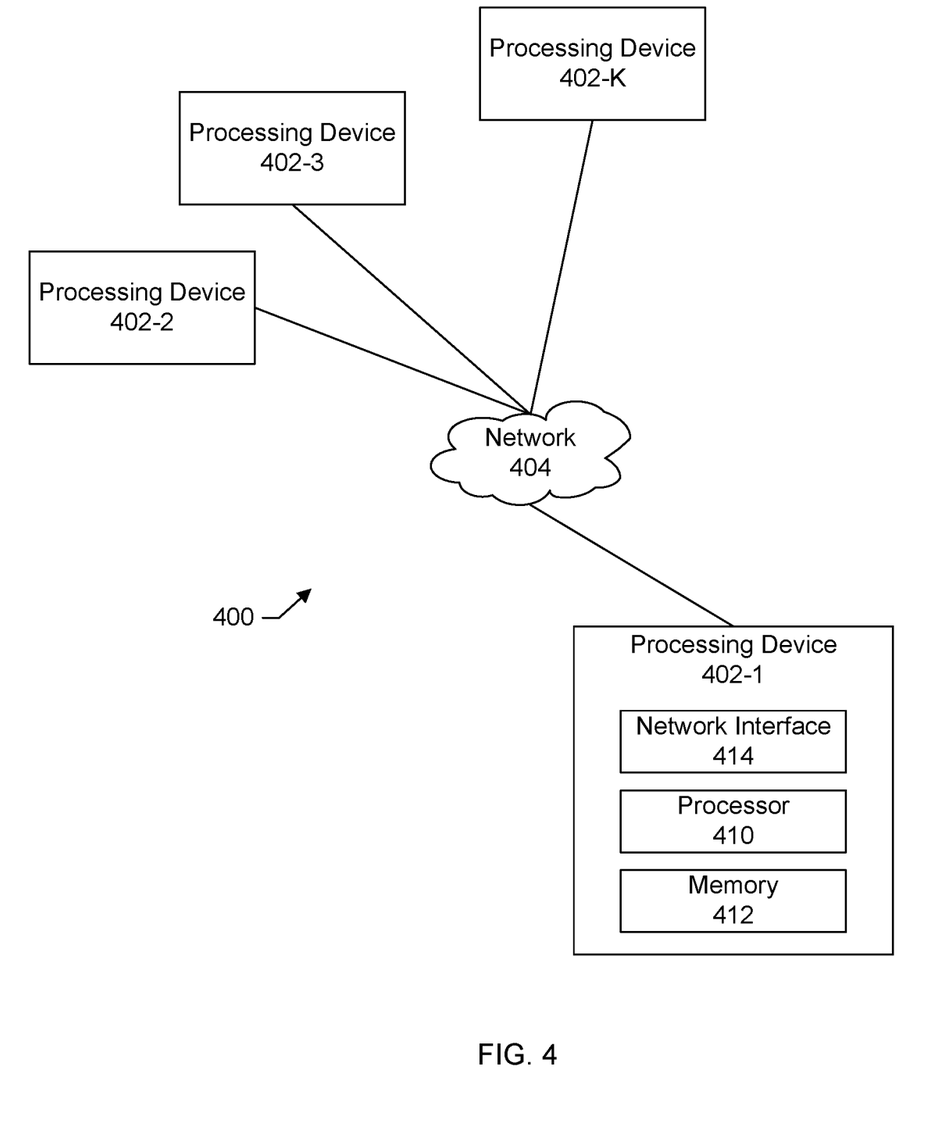
FIG. 4 shows a block diagram of a processing platform that may be utilized to implement at least a portion of an information processing system, according to one or more embodiments.

FIG. 4 shows an example of a processing platform 400. The processing platform 400 in this embodiment comprises a portion of system 100 and includes a plurality of processing devices, denoted 402-1, 402-2, 402-3, . . . 402-K, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 402-1 in the processing platform 400 comprises a processor 410 coupled to a memory 412.

The processor 410 may comprise a microprocessor, a microcontroller, an application-specific integrated circuit (ASIC), a field-programmable gate array (FPGA) or other type of processing circuitry, as well as portions or combinations of such circuitry elements.

The memory 412 may comprise random access memory (RAM), read-only memory (ROM) or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 400 are illustratively implemented in the form of software running on one or more processing devices.

Figure 5:
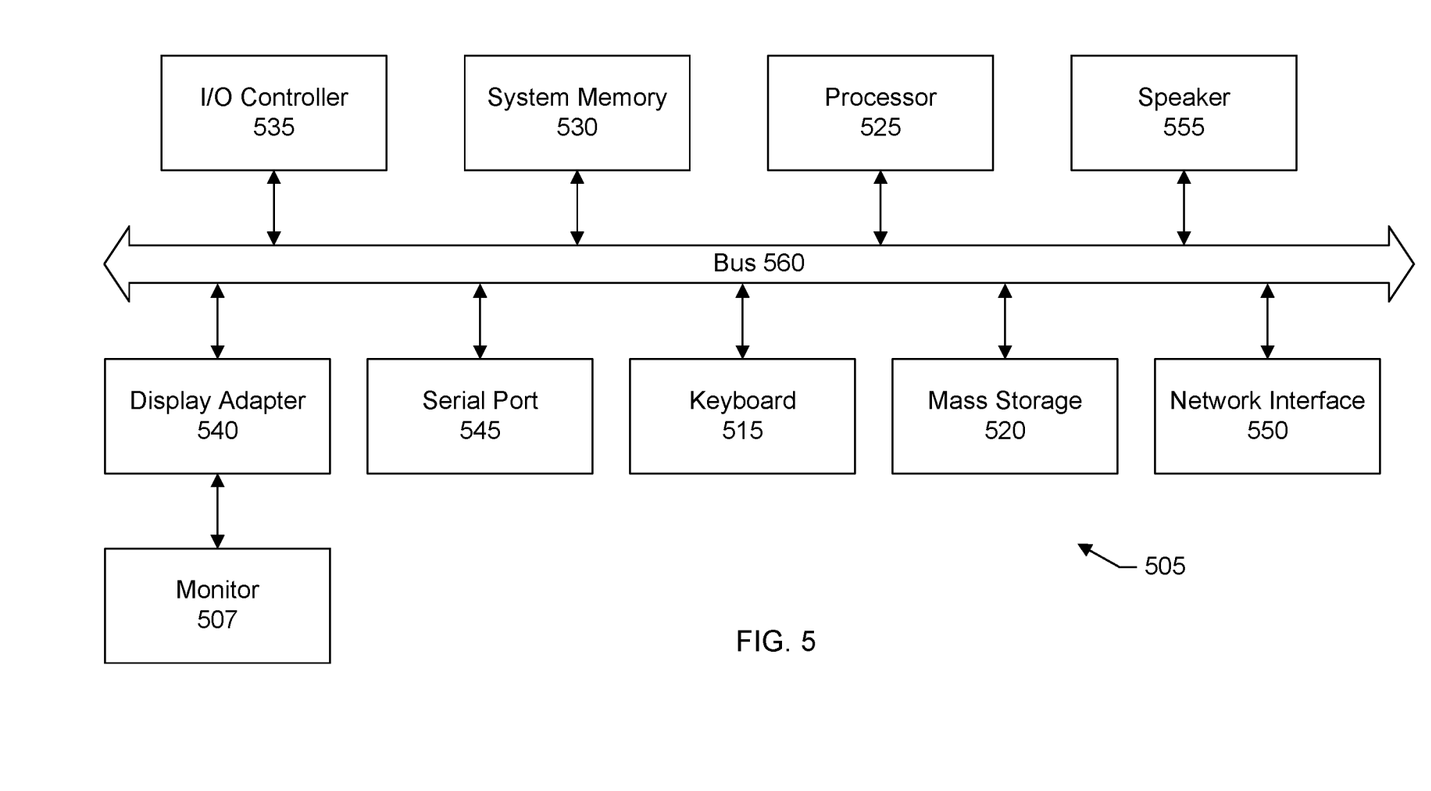
FIG. 5 shows a block diagram of a computer system suitable for use with the information processing system, according to one or more embodiments.

FIG. 5 shows a system block diagram of a computer system 505 used to execute the software of the present system described herein. The computer system includes a monitor 507, keyboard 515, and mass storage devices 520. Computer system 505 further includes subsystems such as central processor 525, system memory 530, input/output (I/O) controller 535, display adapter 540, serial or universal serial bus (USB) port 545, network interface 550, and speaker 555. The system may also be used with computer systems with additional or fewer subsystems. For example, a computer system could include more than one processor 525 (i.e., a multiprocessor system) or a system may include a cache memory.

Arrows such as 560 represent the system bus architecture of computer system 505. However, these arrows are illustrative of any interconnection scheme serving to link the subsystems. For example, speaker 555 could be connected to the other subsystems through a port or have an internal direct connection to central processor 525. The processor may include multiple processors or a multicore processor, which may permit parallel processing of information. Computer system 505 shown in FIG. 5 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for protecting a distributed file system comprising:
   splitting responsibility for protecting the distributed file system across a plurality of client hosts, each client host being assigned a subset of the distributed file system to backup;
   identifying an index host to create a common namespace under which client file indexes generated by the client hosts during backups of respective subsets of the distributed file system by the client hosts will be maintained;
   during the backups, receiving, from the client hosts, the client file indexes, wherein the client file indexes comprise metadata about files in the distributed file system included in the backups;
   associating each of the client file indexes to the same common namespace; and
   allowing the client file indexes to be accessed using a name of the index host to provide a unified view of all files across all subsets of the distributed file system that have been backed up by the client hosts.

2. The method of claim 1 wherein the identifying an index host further comprises:
   prompting an administrator to specify a name of the index host.

3. The method of claim 1 wherein the associating each of the client file indexes to the same common namespace further comprises:
   storing all the client file indexes under a name of the index host, the name of the index host being different from a name of a client host that generated a client file index.

4. The method of claim 1 further comprising:
   receiving, during a backup of a first subset of the distributed file system, a first client file index from a first client host;
   receiving, during a backup of a second subset of the distributed file system, a second client file index from a second client host; and
   storing the first client file index and the second client file index in a directory corresponding to the name of the index host, wherein the name of the index host is different from a name of the first client host, a name of the second client host, or both the name of the first client host and the name of the second client host.

5. The method of claim 1 further comprising:
   maintaining each of the client file indexes under the name of the index host.

6. The method of claim 1 further comprising:
   instructing each of the client hosts to index backups of the distributed file system under the index host.

7. A system for protecting a distributed file system, the system comprising: a processor; and memory configured to store one or more sequences of instructions which, when executed by the processor, cause the processor to carry out the steps of:
   splitting responsibility for protecting the distributed file system across a plurality of client hosts, each client host being assigned a subset of the distributed file system to backup;
   identifying an index host to create a common namespace under which client file indexes generated by the client hosts during backups of respective subsets of the distributed file system by the client hosts will be maintained;
   during the backups, receiving, from the client hosts, the client file indexes, wherein the client file indexes comprise metadata about files in the distributed file system included in the backups;
   associating each of the client file indexes to the same common namespace; and
   allowing the client file indexes to be accessed using a name of the index host to provide a unified view of all files across all subsets of the distributed file system that have been backed up by the client hosts.

8. The system of claim 7 wherein the identifying an index host further comprises:
   prompting an administrator to specify a name of the index host.

9. The system of claim 7 wherein the associating each of the client file indexes to the same common namespace further comprises:

storing all the client file indexes under a name of the index host, the name of the index host being different from a name of a client host that generated a client file index.

10. The system of claim 7 wherein the processor further carries out the steps of:
receiving, during a backup of a first subset of the distributed file system, a first client file index from a first client host;
receiving, during a backup of a second subset of the distributed file system, a second client file index from a second client host; and
storing the first client file index and the second client file index in a directory corresponding to the name of the index host, wherein the name of the index host is different from a name of the first client host, a name of the second client host, or both the name of the first client host and the name of the second client host.

11. The system of claim 7 wherein the processor further carries out the steps of:
maintaining each of the client file indexes under the name of the index host.

12. The system of claim 7 wherein the processor further carries out the steps of:
instructing each of the client hosts to index backups of the distributed file system under the index host.

13. A computer program product, comprising a non-transitory computer-readable medium having a computer-readable program code embodied therein, the computer-readable program code adapted to be executed by one or more processors to implement a method for protecting a distributed file system, the method comprising:
splitting responsibility for protecting the distributed file system across a plurality of client hosts, each client host being assigned a subset of the distributed file system to backup;
identifying an index host to create a common namespace under which client file indexes generated by the client hosts during backups of respective subsets of the distributed file system by the client hosts will be maintained;
during the backups, receiving, from the client hosts, the client file indexes, wherein the client file indexes comprise metadata about files in the distributed file system included in the backups;
associating each of the client file indexes to the same common namespace; and
allowing the client file indexes to be accessed using a name of the index host to provide a unified view of all files across all subsets of the distributed file system that have been backed up by the client hosts.

14. The computer program product of claim 13 wherein the identifying an index host further comprises:
prompting an administrator to specify a name of the index host.

15. The computer program product of claim 13 wherein the associating each of the client file indexes to the same common namespace further comprises:
storing all the client file indexes under a name of the index host, the name of the index host being different from a name of a client host that generated a client file index.

16. The computer program product of claim 13 wherein the method further comprises:
receiving, during a backup of a first subset of the distributed file system, a first client file index from a first client host;
receiving, during a backup of a second subset of the distributed file system, a second client file index from a second client host; and
storing the first client file index and the second client file index in a directory corresponding to the name of the index host, wherein the name of the index host is different from a name of the first client host, a name of the second client host, or both the name of the first client host and the name of the second client host.

17. The computer program product of claim 13 wherein the method further comprises:
maintaining each of the client file indexes under the name of the index host.

18. The computer program product of claim 13 wherein the method further comprises:
instructing each of the client hosts to index backups of the distributed file system under the index host.

* * * * *